(12) United States Patent
Saleri

(10) Patent No.: US 11,047,482 B2
(45) Date of Patent: Jun. 29, 2021

(54) VALVE FOR METHANE IN AUTOMOTIVE SYSTEMS WITH IMPROVED SEALING

(71) Applicant: OMB SALERI S.p.A., Brescia (IT)

(72) Inventor: Paride Saleri, Brescia (IT)

(73) Assignee: OMB SALERI S.p.A., Brescia (IT)

( * ) Notice: Subject to any disclaimer, the term of this patent is extended or adjusted under 35 U.S.C. 154(b) by 0 days.

(21) Appl. No.: 16/504,785

(22) Filed: Jul. 8, 2019

(65) Prior Publication Data
US 2019/0331231 A1 Oct. 31, 2019

Related U.S. Application Data (62) Division of application No. 15/036,336, filed as application No. PCT/IB2014/065323 on Oct. 15, 2014, now abandoned.

(30) Foreign Application Priority Data

Nov. 15, 2013 (IT) .......................... BS2013A000168

(51) Int. Cl.
*F16K 3/00* (2006.01)
*F16K 1/30* (2006.01)
(Continued)

(52) U.S. Cl.
CPC .............. *F16K 1/307* (2013.01); *F16K 1/305* (2013.01); *F16K 15/063* (2013.01); *F16K 17/04* (2013.01); *F16K 17/38* (2013.01); *F16K 31/002* (2013.01); *F16K 31/02* (2013.01); *F17C 13/04* (2013.01); *F17C 2205/0326* (2013.01);
(Continued)

(58) Field of Classification Search
CPC ........ F16K 1/307; F16K 15/063; F16K 17/04; F16K 17/38; F16C 13/04
See application file for complete search history.

(56) References Cited

U.S. PATENT DOCUMENTS

| | | | |
|---|---|---|---|
| 3,997,009 A | * | 12/1976 | Fox ........................... E21B 4/02 175/107 |
| 5,850,881 A | * | 12/1998 | Rodger ................... E21B 21/10 166/327 |

(Continued)

FOREIGN PATENT DOCUMENTS

| | | | |
|---|---|---|---|
| FR | 2977650 A1 ‡ | 1/2013 | ............. F16K 41/04 |
| FR | 2977650 A1 | 1/2013 | |

(Continued)

OTHER PUBLICATIONS

International Search Report for corresponding International Patent Application No. PCT/IB2014/065323 dated Apr. 5, 2015.‡

(Continued)

*Primary Examiner* — Reinaldo Sanchez-Medina
(74) *Attorney, Agent, or Firm* — Merchant & Gould P.C.

(57) ABSTRACT

A valve (1) controls flow of methane in automotive systems and includes at least one sealing group (98) having a proximal sealing ring (99*a*), in direct contact with the gas in rest conditions. A distal sealing ring (99*b*) is made of different materials. A check valve device (120) is applicable to the valve (1) and includes an entrance sealing group (130) provided with a proximal sealing ring (130*a*) and a distal sealing ring (130*b*) made of different materials.

9 Claims, 8 Drawing Sheets

(51) Int. Cl.
*F16K 15/06* (2006.01)
*F17C 13/04* (2006.01)
*F16K 17/04* (2006.01)
*F16K 17/38* (2006.01)
*F16K 31/00* (2006.01)
*F16K 31/02* (2006.01)

(52) U.S. Cl.
CPC ............... *F17C 2205/0332* (2013.01); *F17C 2205/0385* (2013.01); *F17C 2205/0394* (2013.01); *F17C 2221/033* (2013.01); *F17C 2223/0123* (2013.01); *F17C 2223/036* (2013.01); *F17C 2260/036* (2013.01); *F17C 2270/0168* (2013.01)

(56) References Cited

U.S. PATENT DOCUMENTS

| | | | | |
|---|---|---|---|---|
| 6,007,049 | A * | 12/1999 | Wass | F16K 1/302 251/144 |
| 7,971,852 | B2 ‡ | 7/2011 | Otsubo | F16L 55/1108 220/581 |
| 8,327,868 | B2 * | 12/2012 | Lammers | F16K 17/383 137/74 |
| 8,714,560 | B2 ‡ | 5/2014 | Faas | F16J 15/3236 137/625.3 |
| 8,757,268 | B2 * | 6/2014 | LeJeune | F16K 15/063 166/325 |
| 9,752,682 | B2 ‡ | 9/2017 | Winkelmann | F16J 15/166 |
| 2002/0145285 | A1 ‡ | 10/2002 | Katayama | F16L 37/0987 285/423 |
| 2005/0156388 | A1 ‡ | 7/2005 | Takano | F16L 21/035 277/628 |
| 2006/0278280 | A1 * | 12/2006 | Yang | F16K 15/063 137/542 |
| 2010/0108162 | A1 * | 5/2010 | Nishio | F16L 37/23 137/614.03 |
| 2015/0211684 | A1 ‡ | 7/2015 | Santos | F17C 5/06 137/1 |

FOREIGN PATENT DOCUMENTS

| | | | | |
|---|---|---|---|---|
| GB | | 789249 A | ‡ 1/1958 | ............ F16K 15/06 |
| GB | | 789249 A | 1/1958 | |
| WO | | 2010026100 A1 | 3/2010 | |
| WO | WO-2010026100 A1 | ‡ 3/2010 | ................ F16J 1/01 |

OTHER PUBLICATIONS

Italian Search Report for corresponding Italian Patent Application No. BS2013A000168 dated Jul. 24, 2014.‡

International Preliminary Report on Patentability for corresponding International Patent Application No. PCT/IB2014/065323 dated Feb. 16, 2016.‡

\* cited by examiner
‡ imported from a related application

VALVE FOR METHANE IN AUTOMOTIVE SYSTEMS WITH IMPROVED SEALING

This application is a Divisional of U.S. patent application Ser. No. 15/036,336, filed 12 May 2016, which is a National Stage Application of PCT/IB2014/065323, filed 15 Oct. 2014, which claims benefit of Serial No. BS2013A000168, filed 15 Nov. 2013 in Italy and which applications are incorporated herein by reference. To the extent appropriate, a claim of priority is made to each of the above disclosed applications.

BACKGROUND OF THE INVENTION

The object of the present invention a valve applicable to a reservoir, usually on board a vehicle, for flow controlling of methane gas in automotive systems.

As is known, such valves are provided both with the components for carrying out the usual valve functions of supply of methane to the reservoir and of delivery of the methane to the vehicle engine, and with numerous accessory devices which for example carry out safety functions.

Currently, in the field of valves for methane, the need is felt to have valves that can control very large reservoirs, such as intended for commercial vehicles, industrial vehicles and the like.

For such valves, special technical solutions are required, which for example allow a refill of the reservoir at high speed.

In particular, among the many consequences of carrying out a supply at high speed, there is the considerable lowering of the temperature of the valve, due to contact with the flow of gas being supplied. Some experimental data show, for example, that the flow of incoming gas at high speed reaches a temperature of even −50° C. or less for short time intervals.

At such temperatures, traditional seals provided in the valve show some drawbacks that impair the optimal performance thereof, with the consequent risk of a gas leaks during refueling.

SUMMARY OF THE INVENTION

The object of the present invention is to provide a valve for methane which meets the above requirements and overcomes the drawbacks of the prior art.

BRIEF DESCRIPTION OF THE DRAWINGS

The features and advantages of the valve or methane according to the present invention will appear more clearly from the following description, made by way of an indicative and non-limiting example with reference to the accompanying figures, in which.

DETAILED DESCRIPTION OF THE PREFERRED EMBODIMENTS

With reference to the accompanying figures, reference numeral 1 globally denotes a valve applicable to a reservoir (not shown) for controlling the flow of methane in automotive systems. Usually, the reservoir is installed on board a vehicle and the methane therein is stored at high pressure. The valve is permanently applied to the mouth of such a reservoir, except in case of extraordinary maintenance.

Valve 1 comprises a valve body 2, preferably made in one piece, for example of a metal material such as brass, aluminium and the like.

The valve body 2 comprises in particular a neck 4, preferably threaded, for example externally, for screwing with the mouth of the reservoir, and a reservoir duct 6 made through neck 4, for the transit of methane into the internal chamber of the reservoir in a filling step of the reservoir and from the reservoir in an emptying step, in case of intervention of a safety device.

Preferably, the reservoir duct 6 extends along a rectilinear attachment axis Z and ends in a plurality of main apertures 8, for example shaped as windows that follow one another circumferentially, placed through the side wall of neck 4, for the transit of the gas.

Moreover, the valve body 2 comprises an entrance duct 10, annularly delimited by a lateral entrance wall 10a, which extends along a rectilinear entrance axis X, for the entry of methane during refueling.

In particular, the entrance duct 10 is adapted for connection with a charging pipe, upstream of which the user can insert the filler to supply the methane.

Valve 1 comprises a check valve device 120, applied to the entrance duct 10, at least partially housed in said entrance duct 10.

The check valve device 120 preferably comprises a tubular main body 122, which extends between a front end 124, external to the valve body 2, and an opposite rear end 126. At the front end 124 there is an entrance aperture 128 for the connection with the charging pipe.

The main body 122 is applied to the entrance duct 10, for example by means of an outer thread 125.

Axially alongside the outer thread 125, on the side facing the interior of the valve body 122, device 120 is provided with an entrance sealing group 130 with the lateral wall 10a of the entrance duct 10.

Figure 4:
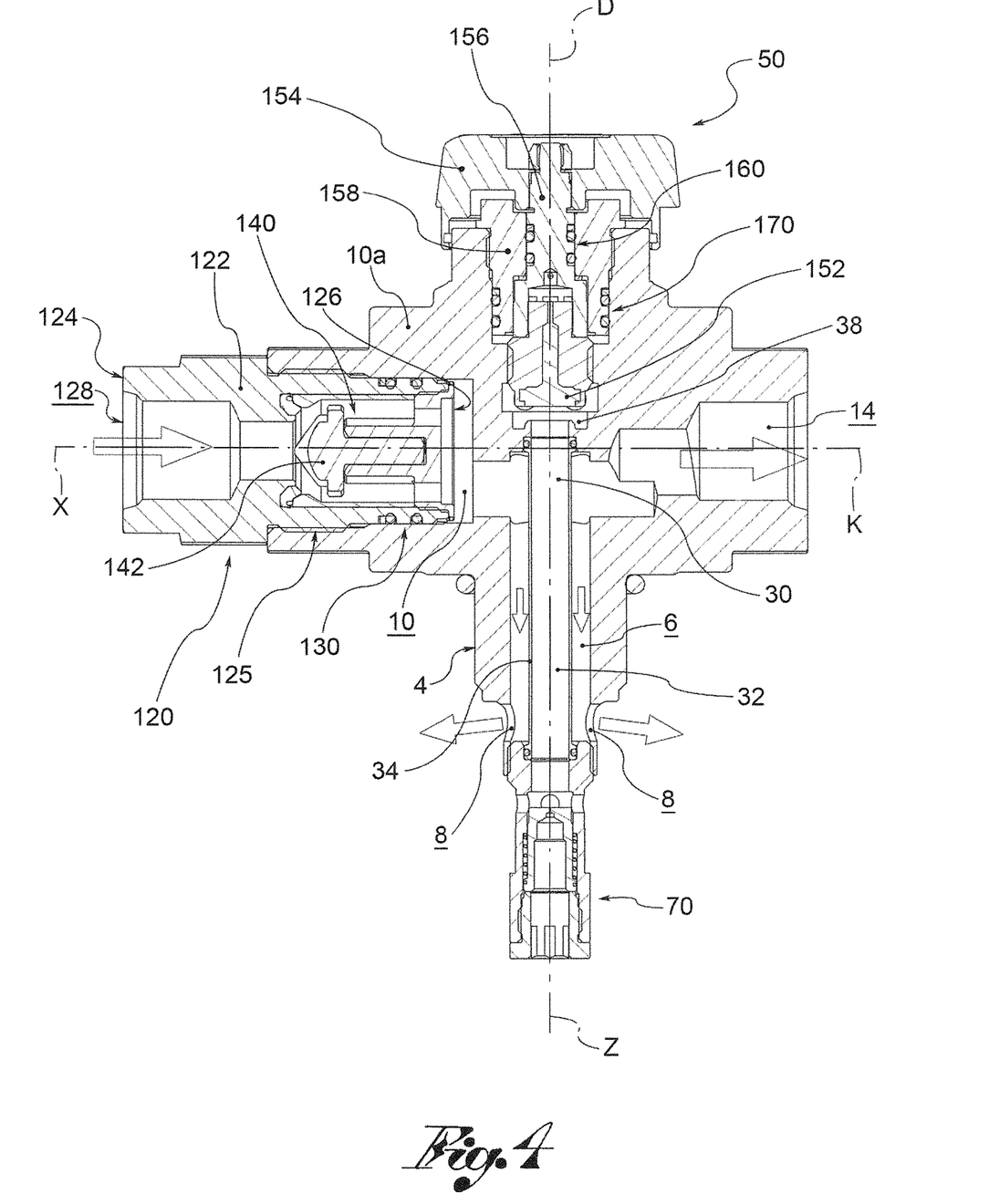
FIG. 4 shows a sectional view of the valve in FIG. 2, according to the sectional plane IV-IV in FIG. 3.
Figure 5:
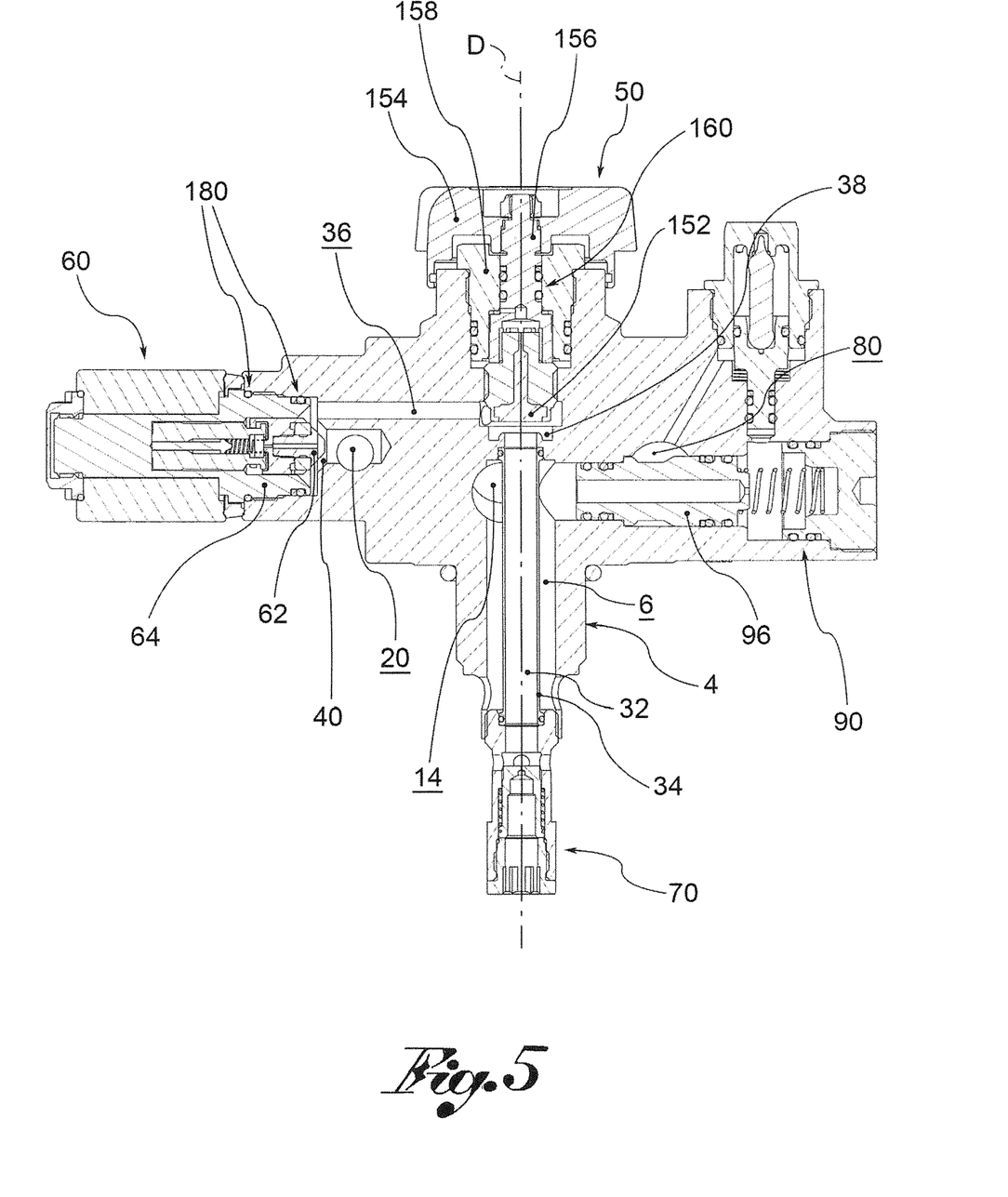
FIG. 5 shows a sectional view of the valve in FIG. 2, according to the sectional plane V-V in FIG. 3.
Figure 6:
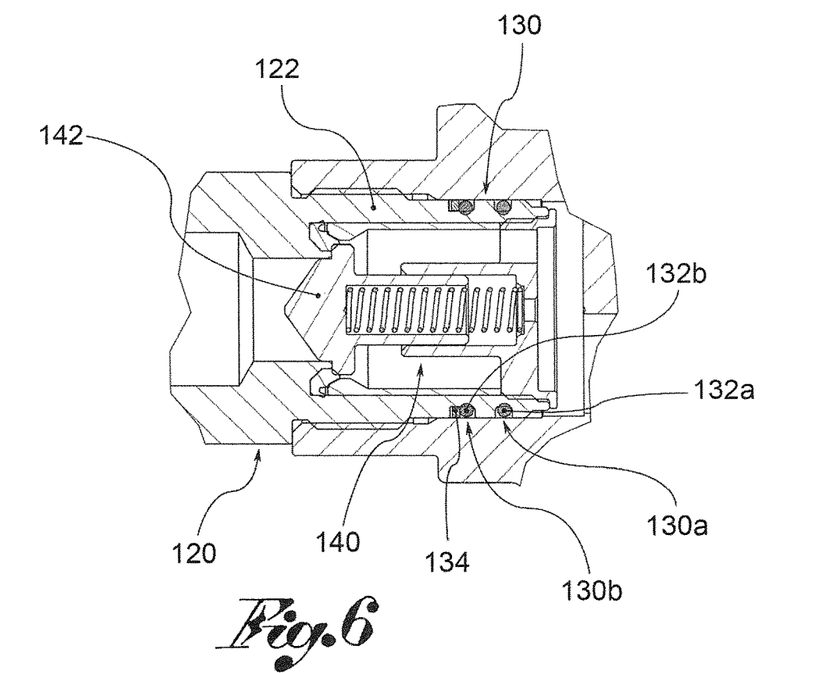
FIG. 6 shows a detail of a check valve device of the valve according to the present invention.
Figure 7:
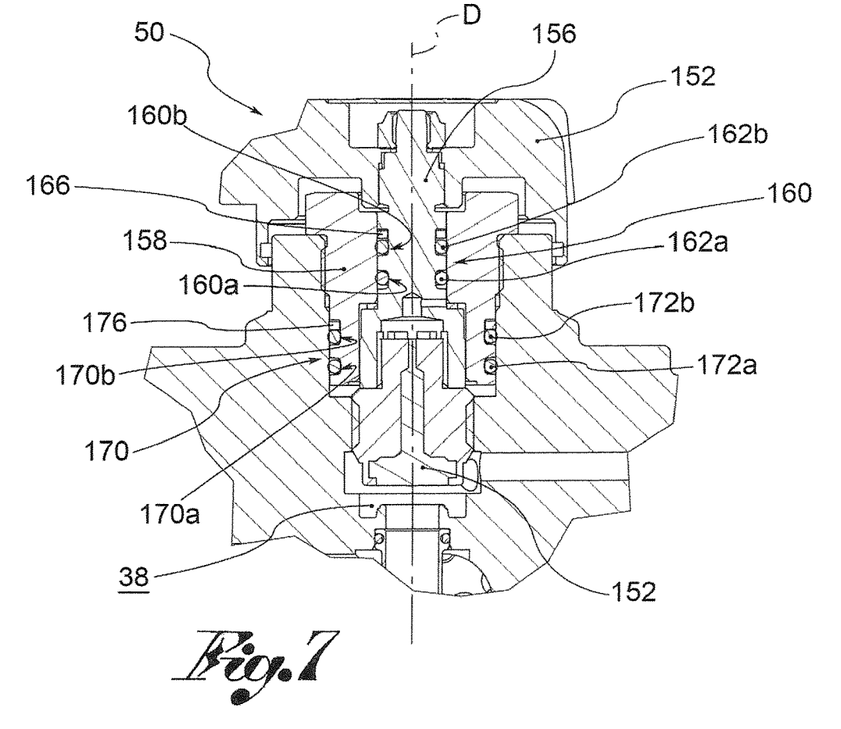
FIG. 7 shows a detail of a tap of the valve according to the present invention.
Figure 8A:
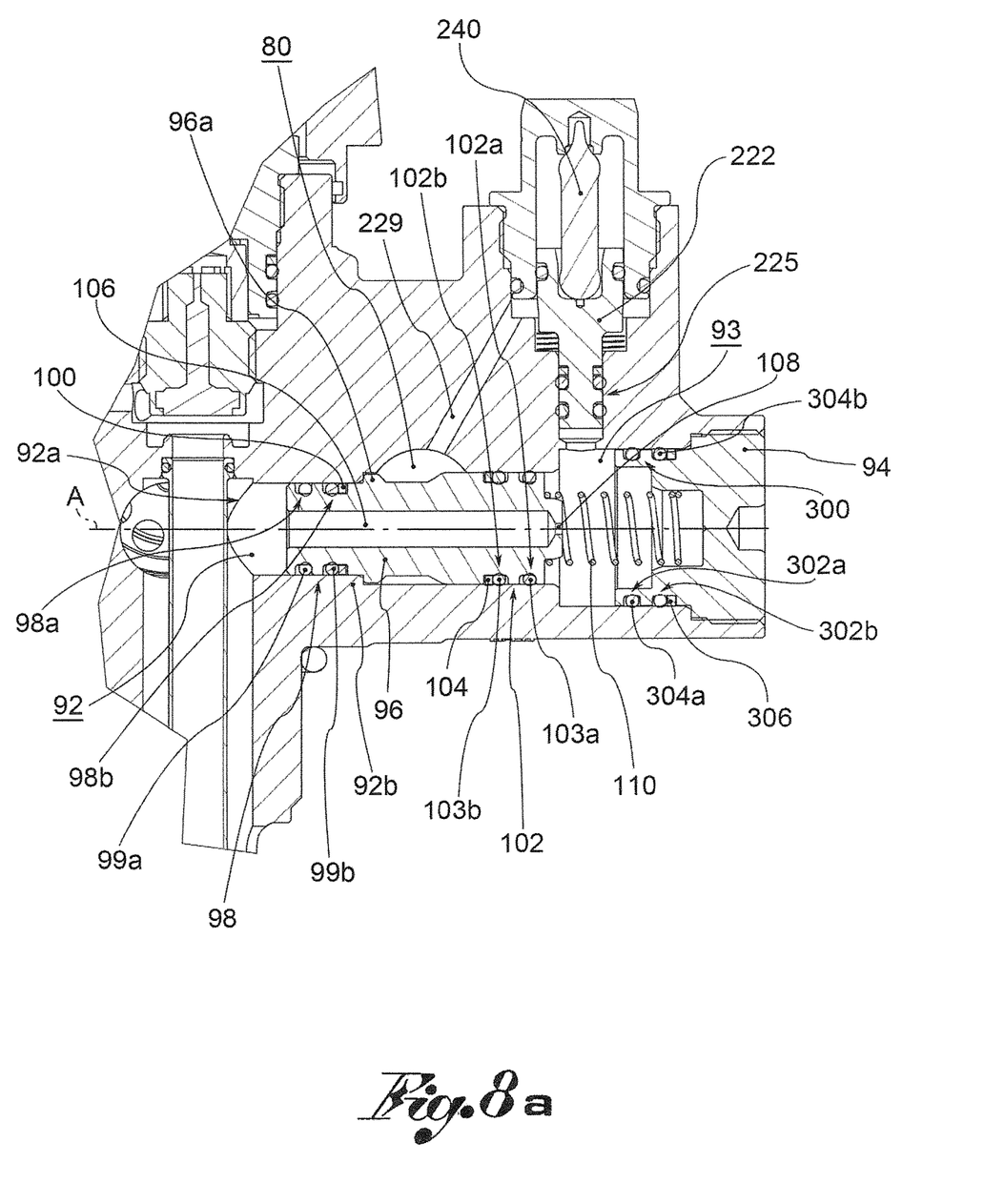
FIG. 8a shows a detail of the thermal safety device of the valve according to the present invention, in a closed configuration.
Figure 8B:
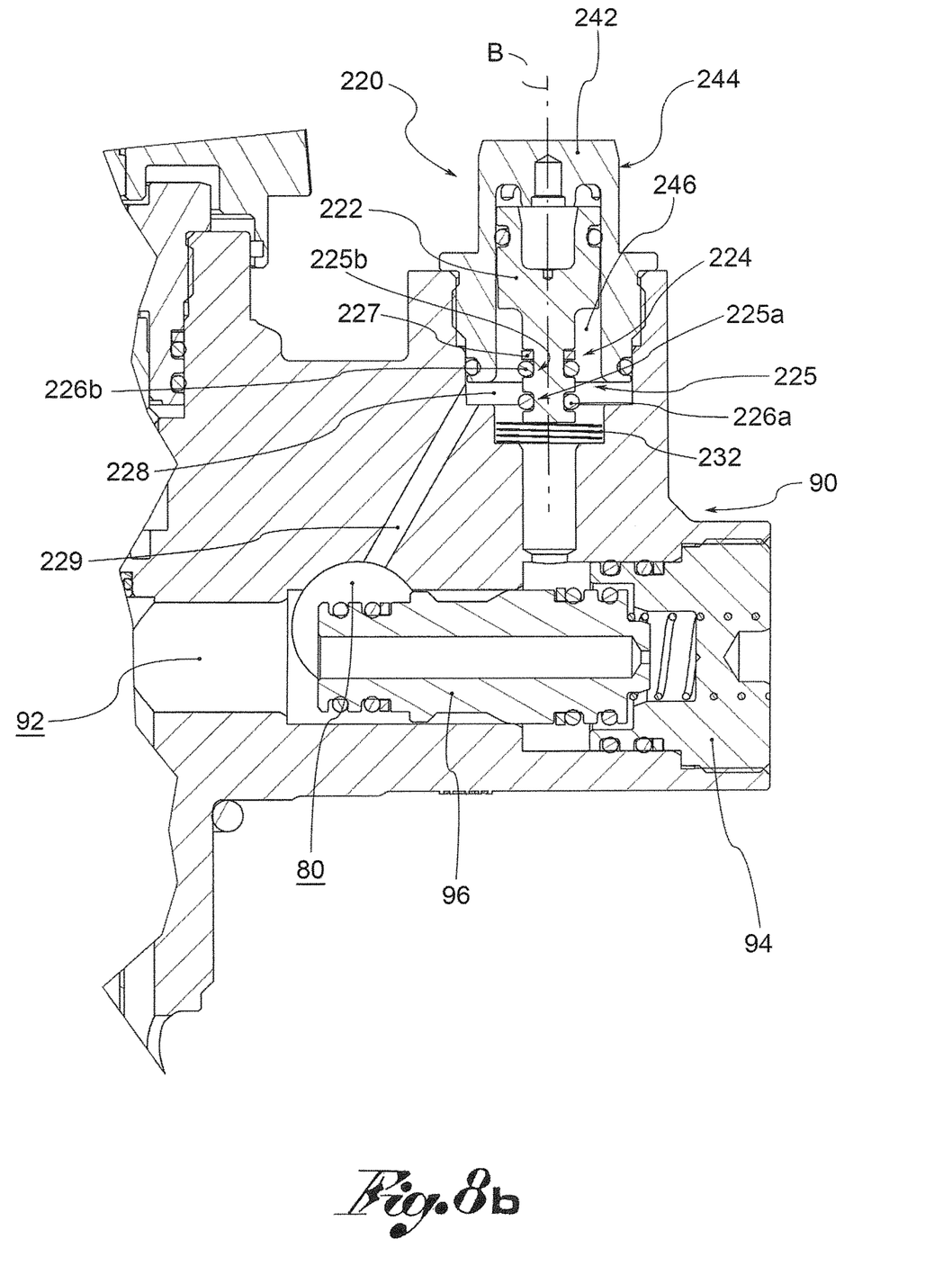
FIG. 8b shows a detail of the thermal safety device of the valve according to the present invention, in a final open configuration.
Figure 9:
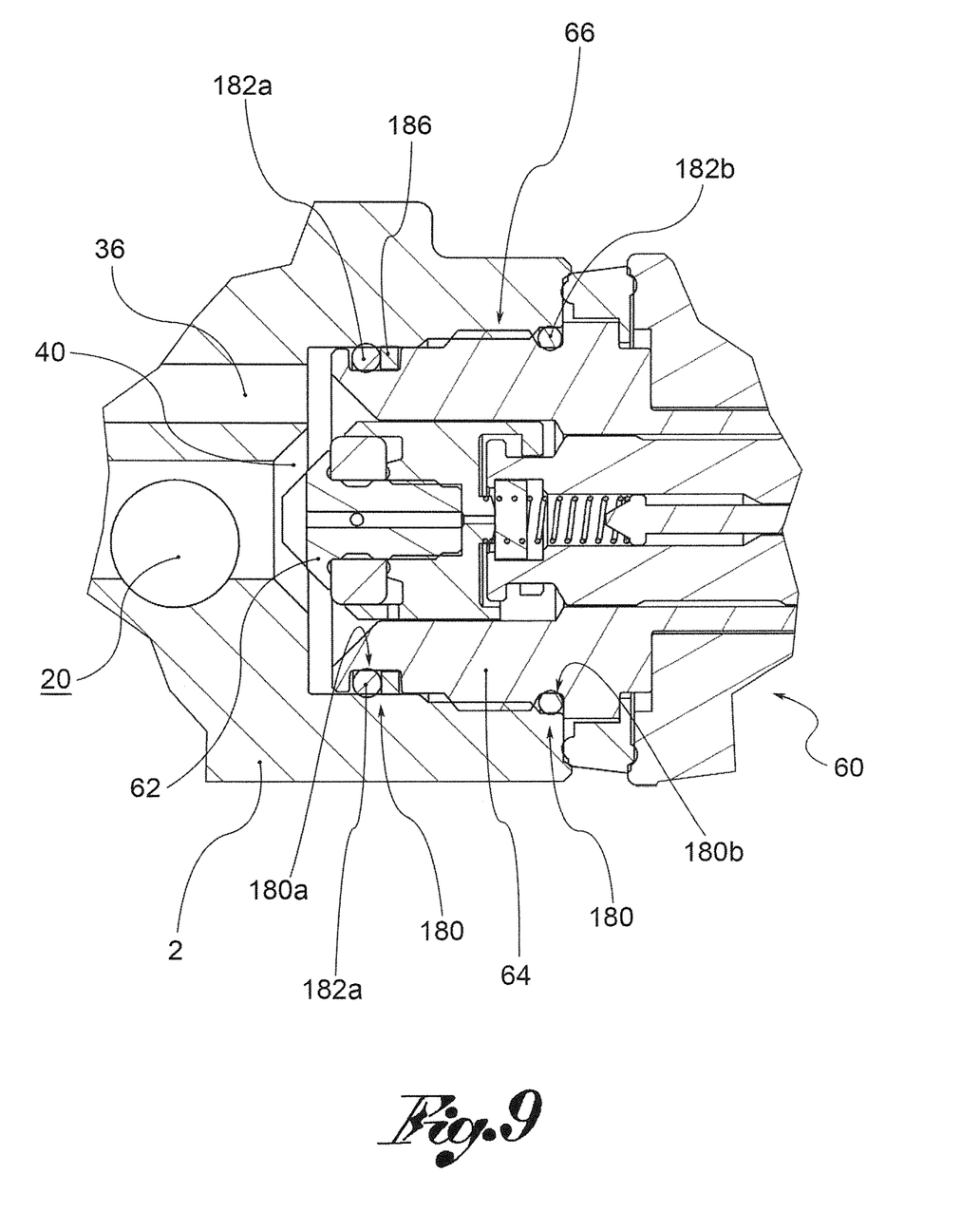
FIG. 9 shows a detail of a portion of electrovalve of the valve according, to the present invention.

The entrance sealing group 130 comprises at least a pair of entrance sealing seats, and in particular a proximal sealing seat 130a and a distal sealing seat 130b, with reference to the rear end 126 of the main body 122. As shown in FIG. 4 and FIG. 6, the diameter varies along the tubular main body 122. The tubular body 122 forms a central chamber connecting the obturator chamber 140 and the fluid entrance front end 124. The central chamber has a smaller diameter than the obturator chamber 140 and the fluid entrance aperture 128. An outer engagement portion of the main body has an outer diameter greater than an outer diameter of the threaded portion 125 and axially nearer the fluid entrance end 124 than the threaded portion 125. An outer diameter of the of the valve body proximate the sealing seats 130a, 130b is less than an outer diameter of the threaded portion 125.

Moreover, the entrance sealing group 130 comprises an entrance sealing ring housed in the respective entrance sealing seat; in particular, the entrance sealing group 130 includes a proximal sealing ring 132a, arranged in the proximal sealing seat 130a, and a distal sealing ring 132b, arranged in the distal sealing seat 130b.

The proximal sealing ring, i.e. the innermost ring in the valve body, in direct contact with the gas in rest conditions, and the distal sealing ring, i.e. the outermost ring in the valve body, are made of different materials in order to achieve the optimum seal in different or only partially overlapping temperature ranges.

In particular, the material of the distal sealing ring has at low temperatures, for example in the range of −30° C.-50° C., an elasticity greater than the material of the proximal sealing ring.

Moreover, the material of the distal sealing ring is adapted to achieve an optimum seal even at very low temperatures, such as −70° C., even if for short periods of time.

The material of the distal sealing ring also ensures a methane seal, good hardness and thus mechanical resistance to pressure at such temperatures.

For example, according to an embodiment of the invention, the proximal sealing ring 132a of the entrance sealing group 130 is made of fluorocarbon rubber, for example an FKM fluorocarbon rubber.

On the other hand, the distal sealing ring 132b of the entrance sealing group 130 is for example made of a fluorosilicone rubber, such as an FMQ or an FVMQ rubber, which maintains excellent sealing properties even at low temperatures.

In other words, the proximal sealing ring is made of an effective and functional material for sealing at temperatures between +200° C. and −20° C. (or with special mixtures up to −40° C.) and the distal sealing ring is made of an effective and functional material for sealing at lower temperatures, such as between +170° C. and −50° C. (and even lower, such as −70° C. for short time intervals).

According to a preferred embodiment, the entrance sealing group 130 includes at least one anti-extrusion ring arranged in the relative sealing seat together with the respective sealing ring, adapted to prevent the escape of the sealing ring from its seat.

For example, the entrance sealing group 130 includes an anti-extrusion ring 134, arranged in the distal sealing seat 130b together with the relative distal sealing ring 132b.

For example, the anti-extrusion ring is made of polytetrafluoroethylene (PTFE).

The valve device 120 includes an obturator group 140, housed in the main body 122, including a check obturator 142 adapted to translate to allow or prevent the transit of gas through the main body 122.

Preferably, moreover, the valve body 2 comprises an auxiliary reservoir duct 14 intended to be connected to a further reservoir to increase the autonomy of the vehicle.

Preferably, the auxiliary reservoir duct 14 extends along an auxiliary attachment axis K, for example coaxial with the entrance axis X.

Moreover, the valve body 2 includes a delivery duct 20 adapted to be connected with the vehicle engine to supply it with methane.

Preferably, the delivery duct 20 extends along a rectilinear delivery axis Y, for example distinct from and parallel to the entrance axis X and, if provided, to the auxiliary reservoir axis K.

Valve 1 further comprises a feed duct 30 connected upstream with the internal chamber of the reservoir and downstream with the delivery duct 20, fluidically separate from the reservoir duct 6.

In particular, the feed duct 30 comprises a by-pass duct 32, placed within the reservoir duct 6, separate from said reservoir duct 6; for example, the by-pass duct is defined by a by-pass tube 34 housed in the reservoir duct 6.

The feed duct 30 further comprises, preferably, an auxiliary passage 36 made in the valve body 2, connectable upstream with the by-pass duct 32 and connectable downstream with the delivery duct 20.

Preferably, between the by-pass duct 32 of the feed duct 30 and the auxiliary passage 36, the valve body 2 has a closure seat 38 and, a valve seat 40 between the auxiliary passage 36 and the delivery duct 20.

Preferably, valve 1 comprises a manual tap 50, applied to the valve body 2, adapted to be manipulated to engage an obturator body 152 with the closure seat 38 to obstruct, in whole or in part, the transit of the methane from the by-pass duct 32 to the auxiliary passage 36 (and thus to the delivery duct 20).

The manual closing operation is necessary to perform maintenance operations downstream of valve 1.

In normal operation, tap 50 is clearly open and the transit of methane from the by-pass conduit 32 to the auxiliary passage 36 is free.

According to a preferred embodiment, tap 50 includes a knob 154, located outside the valve body 2, rotatable about a tap axis D, such as parallel or coincident with the attachment axis Z of the reservoir duct 6.

Tap 50 also includes a shaft 156, integral with the knob and engaged with obturator 152 to cause the lowering (and thus the closure) or lifting (and thus the opening) thereof by the closure seat 38.

Preferably, tap 50 also includes, between shaft 156 and the valve body 2, a fixed bush 158, crossed by shaft 156 before engaging with obturator 152.

According to an embodiment of the invention, shaft 156 of tap 50 includes a first tap sealing group 160 which produces a gas seal between shaft 156 and bush 158 (or, in an embodiment variation not shown, with the surrounding wall of the valve body 2).

The first tap sealing group 160 includes a proximal seat 160a, towards the inside of the valve body, and a distal seat 160b as well as respective sealing rings 162a, 162b, housed in the respective seats and, preferably, an anti-extrusion ring 166.

As shown with reference to the entrance sealing group 130, also for the first tap sealing group 160 the proximal sealing ring, i.e. the innermost ring in the valve body, in direct contact with the gas in rest conditions, and the distal sealing ring, i.e. the outermost ring in the valve body, are made of different materials in order to obtain an optimal seal in different or only partially overlapping temperature ranges.

According to one embodiment of the invention, bush 158 of tap 50 includes a second tap sealing group 170, which forms a gas seal between the valve body 2 and bush 158.

The second tap sealing group 170 includes a proximal seat 170a, towards the interior of the valve body, and a distal seat 170b, as well as respective sealing rings 172a, 172b, received in the respective locations and, preferably, an anti-extrusion ring 176.

As shown with reference to the entrance sealing group 130, also for the second tap sealing group 170 the proximal sealing ring, i.e. the innermost ring in the valve body, in direct contact with the gas in rest conditions, and the distal sealing ring, i.e. the outermost ring in the valve body, are made of different materials in order to obtain an optimal seal in different or only partially overlapping temperature ranges.

Moreover, valve 1 includes an electrovalve 60, applied to the valve body, adapted to be operated remotely, electronically, to allow or prevent the methane flow to the delivery duct 20, for example depending on the on or off condition of the engine, or more generally on the controls from the vehicle electronic control unit.

To this end, an obturator body 62 of electrovalve 60 cooperates with the valve seat 40 to prevent the methane flow to the delivery duct 20.

Preferably, electrovalve 60 includes an engagement body 64, for example screwed to the valve body by a threading 66, within which the obturator member 62 of said electrovalve 60 is supported in a translatable manner.

According to an embodiment of the invention, the engagement body 64 of electrovalve 60 comprises an electrovalve sealing group 180 which forms a gas seal between the engagement body 64 and the valve body 2.

The electrovalve sealing group 180 comprises a proximal seat 180*a*, towards the interior of the valve body, and a distal seat 180*b*, as well as respective sealing rings 182*a*, 182*b*, housed in the respective seats and, preferably, an anti-extrusion ring 186, for example arranged in the proximal seat 180, in engagement with the proximal ring 182*a*.

Preferably, thread 66 is placed between the proximal seat 180*a* and the distal seat 180*b*.

As shown with reference to the entrance sealing group 130, also for the electrovalve sealing group 180 the proximal sealing ring, i.e. the innermost ring in the valve body, in direct contact with the gas in rest conditions, and the distal sealing ring, i.e. the outermost ring in the valve body, are made of different materials in order to obtain an optimal seal in different or only partially overlapping temperature ranges.

Valve 1 further includes an excess flow blocking device 70 operating upstream of the feed duct 30, and in particular upstream of the by-pass duct 32 thereof, and downstream of the main aperture 8 of the reservoir duct 6 towards the internal chamber of the reservoir.

The blocking device 70 is adapted to choke the transit of methane to the feed duct 30 in the presence of a methane flow exceeding a predefined threshold value.

For example, such a blocking device 70 is actuated when, due to a rupture of a tube downstream of the delivery duct 20, there is an increased methane flow that escapes.

Moreover, the valve body 2 includes a discharge duct 80 in communication downstream with the external environment and connectable upstream with the reservoir duct 6 and, in the variants provided with the auxiliary reservoir duct 14, with said auxiliary reservoir duct 14.

The discharge duct 80 extends along a rectilinear discharge axis Y.

According to the invention, valve 1 further comprises a temperature-sensitive thermal safety device 90 operating between the reservoir duct 6 and the discharge duct 80 and adapted, in a closed configuration, to prevent the transit of methane from the reservoir duct 6 to the discharge duct 80 and in an open configuration, to allow the transit of methane from the reservoir duct 6 to the discharge duct 80.

The thermal safety device 90 is adapted allow the discharge of methane from the reservoir duct 6 to the discharge duct 80 (i.e. towards the external environment) when the temperature exceeds a predefined threshold value and prevent such a discharge.

According to a preferred embodiment, the valve body 2 includes a safety chamber 92 in communication on one end with the reservoir duct 6 (and with the auxiliary reservoir duct 14, if provided), via a safety aperture 92*a*; on the other end, the valve body includes a rear compartment 93, closed by a plug 94, for example threaded.

Preferably, the safety chamber 92 extends along a safety chamber axis A, preferably perpendicular to the attachment axis Z of the reservoir duct 6.

Preferably, moreover, the safety chamber axis A is perpendicular to the discharge axis W of the discharge duct 80.

The safety chamber 92 is connectable with the discharge duct 80 and also has an abutment 92*b*, placed for example between the safety aperture 92*a* and the discharge duct 80.

The thermal safety device 90 comprises a main obturator 96, sealingly sliding in the safety chamber 92 and adapted, through a radial projection 96*a* thereof, to abut with abutment 92*b*, defining the advance end stroke.

For example, the main obturator 96 includes a front sealing group 98, for the seal between the safety chamber 92 and the discharge duct 80, and/or a rear sealing group 102, for the seal between the rear compartment 93 and the discharge duct 80.

Preferably, the section on which the front sealing group 98 operates is less than the section on which the rear sealing group 102 operates.

According to an embodiment of the invention, the front sealing group 98 includes a proximal seat 98*a*, close to the safety chamber 92, and a distal seat 98*b*, as well as a proximal sealing ring 99*a* housed in the proximal sealing seat 98*a* and a distal sealing ring 99*b* housed in the distal sealing seat 98*b*, and, preferably, an anti-extrusion ring 100 housed in the distal seat 98*b*.

Likewise, the rear sealing group 102 includes a proximal seat 102*a*, close to the rear compartment 93, and a distal seat 102*b*, as well as a proximal sealing ring 103*a* housed in the proximal sealing seat 102*a* and a distal sealing ring 103*b* housed in the distal sealing seat 102*b* and, preferably, an anti-extrusion ring 104 housed in the distal seat 102*b*.

As shown with reference to the entrance sealing group 130, also for the front sealing group 98 and for the rear sealing group 102 the proximal sealing ring, i.e. the innermost ring in the valve body, in direct contact with the gas in rest conditions, and the distal sealing ring, i.e. the outermost ring in the valve body, are made of different materials in order to obtain an optimal seal in different or only partially overlapping temperature ranges.

The main obturator 96 has a through duct 106, which connects the area upstream of obturator 96 with the downstream area, i.e. with the rear compartment 93.

In particular, the through duct 106 is in connection with the rear compartment 93 through an orifice 108 smaller than the passage section of the remaining part of the through duct 106.

The safety device 90 further comprises an elastic safety element 110, adapted to influence in closing, for example, to push in closing, the main obturator 96, towards the advance stroke end abutment 92*b*.

For example; the elastic safety element 110 is in compression between plug 94 and the main obturator 96.

The thermal safety device 90 further comprises a temperature-sensitive driving device 220 adapted to influence the main obturator 96 to move it and put the reservoir duct 6 in communication with the external environment through the discharge duct 80.

In particular, the driving device 220 is sensitive to the external temperature and adapted to generate a pressure differential between the area upstream of the main obturator 96 and the area downstream of the same, i.e. the rear compartment 93, in order to obtain the movement of said main obturator 96 and put the reservoir duct 6 in communication with the discharge duct 80.

According to a preferred embodiment, the driving device 220 comprises a driving obturator 222, sliding in a driving seat 224.

Preferably, the driving seat 224 extends along a driving seat axis B, for example incident, for example orthogonally, to the safety chamber axis A.

Preferably, the driving seat 224 has a section smaller than the section of the safety chamber 92 in which the main obturator 96 slides and that connects the reservoir duct 6 with the discharge duct 80.

The driving obturator 222 comprises a driving sealing group 225 for the seal with the driving seat 224.

According to an embodiment of the invention, the driving sealing group 225 includes a proximal seat 225a, next to the rear compartment 93, and a distal seat 225b, as well as a proximal sealing ring 226a housed in the proximal sealing seat 225a and a distal sealing ring 226b housed in the distal sealing seat 225b and, preferably, an anti-extrusion ring 227 housed in the distal seat 225b.

As shown with reference to the entrance sealing group 130, also for the driving sealing group 180 the proximal sealing ring, i.e. the innermost ring in the valve body, in direct contact with the gas in rest conditions, and the distal sealing ring, i.e. the outermost ring in the valve body, are made of different materials in order to obtain an optimal seal in different or only partially overlapping temperature ranges.

The valve body 2 also has a driving compartment 228 connected upstream with the downstream area of the main obturator 96 or the rear compartment 93 and downstream with the external environment.

For example, the driving compartment 228 is in connection with the external environment via a driving duct 229, for example made in the valve body 2, which connects it with the discharge duct 80.

Preferably, the driving obturator 222 is adapted to close the connection between the driving compartment 228 and the area downstream of the main obturator 96 or the rear compartment 93, through the driving sealing group 225.

Preferably, the driving device 220 comprises an elastic driving element 232 adapted to influence in opening the driving obturator 222, i.e. in the direction of moving said driving obturator 222 to put the area downstream of the main obturator 96 or rear compartment in communication with the external environment, for example through the driving compartment 228.

The safety device 90 further comprises a thermosensitive element 240 sensitive to temperature which, for a temperature higher than a predefined threshold becomes yielding to the mechanical actions exerted by the driving obturator 222; for example, said thermosensitive element 240 melts or bursts or becomes so soft as not to oppose said mechanical actions.

The thermosensitive element 240 is arranged to oppose the opening movement of the driving obturator 122; for example, the thermosensitive element 240 is in abutment with the driving obturator 222 on one end and in abutment with a fixed element 242, for example a bottom of a plug 244, on the other.

Preferably, the thermosensitive element 240 is housed in an auxiliary compartment 246, delimited by said bottom 242 and by the driving obturator 222.

Figure 1:
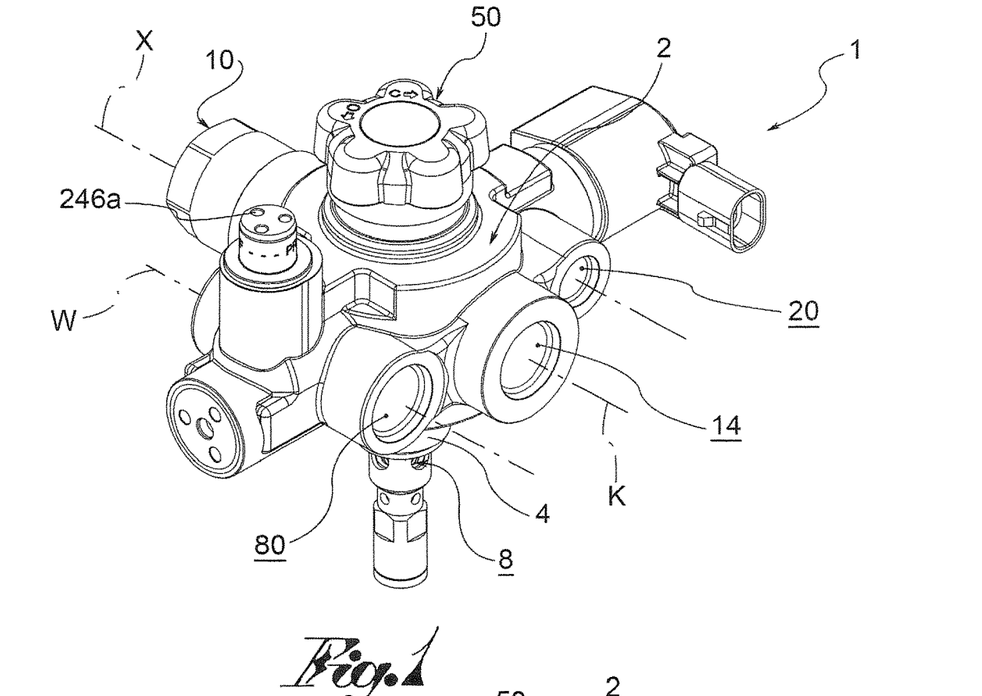
FIG. 1 shows a valve for methane according to an embodiment of the present invention, according to a first observation point.
Figure 2:
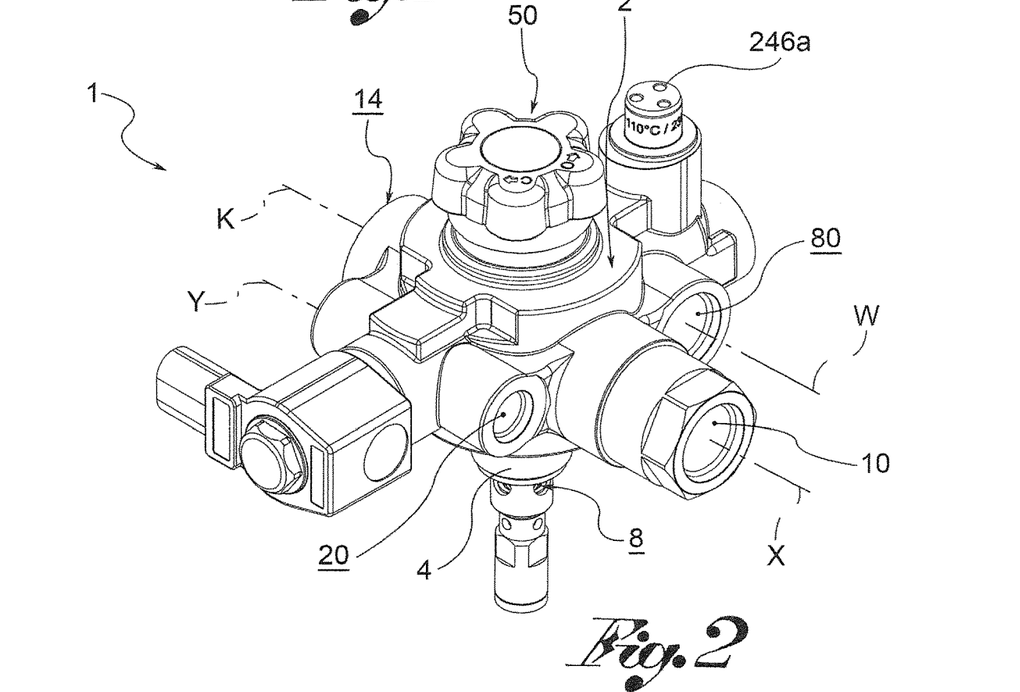
FIG. 2 shows the valve in FIG. 1, according to a further observation point.
Figure 3:
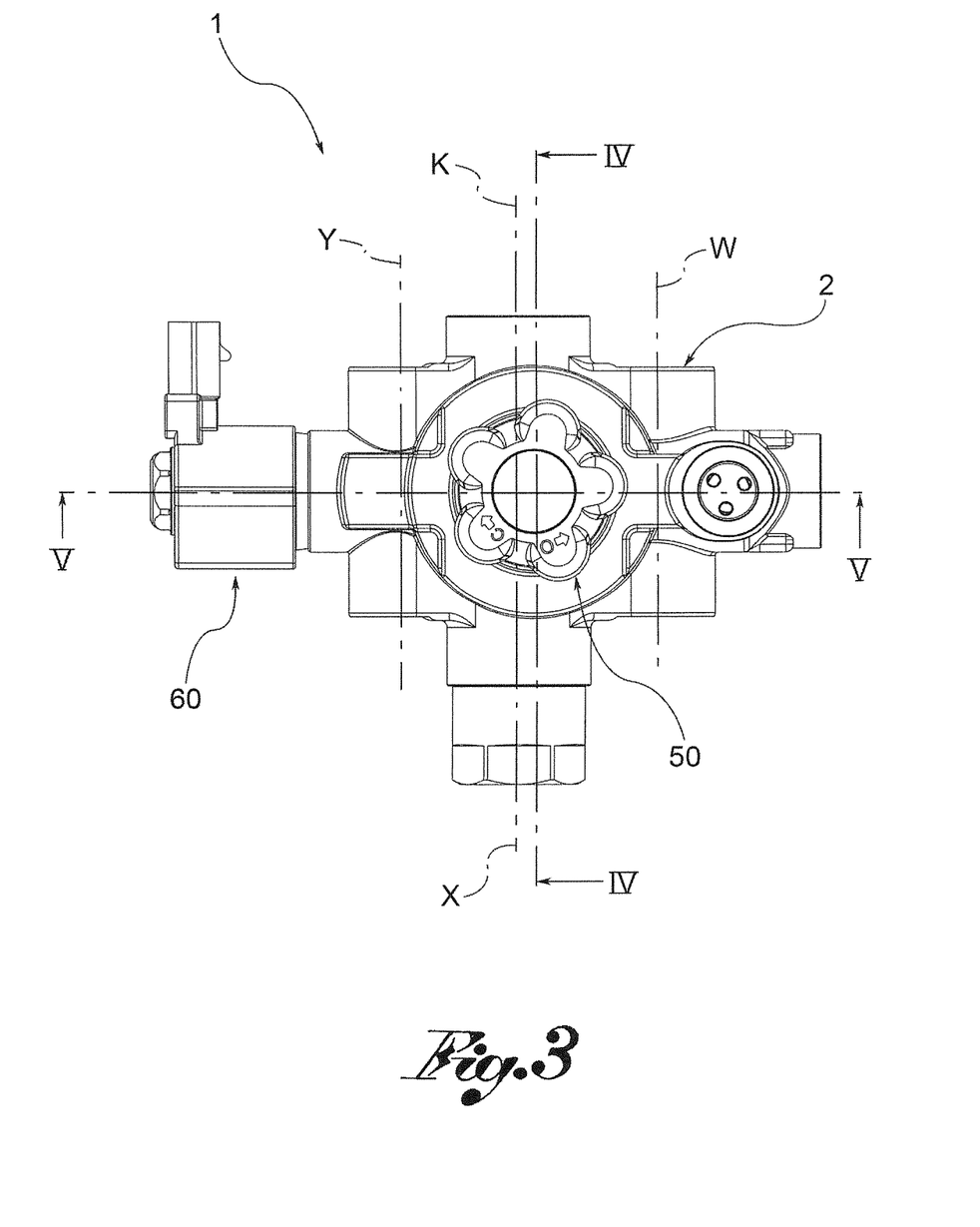
FIG. 3 shows a plan view of the valve in FIG. 2.

Preferably, the auxiliary compartment 246 is in communication with the external environment through holes 246a (FIGS. 1 and 2) formed through bottom 242 of plug 244. The driving obturator 222 also creates a seal with the walls of said auxiliary compartment 246 to prevent the escape of methane through holes 246a during the activation step of the thermal safety device.

Preferably, also plug 94 which closes the rear compartment 93 comprises a plug sealing group 300 to provide the seal with the surrounding wall of the valve body 2.

The plug sealing group 300 includes a proximal seat 302a, close to the rear compartment 93, and a distal seat 302b, as well as a proximal sealing ring 304a housed in the proximal sealing seat 302a and a distal sealing ring 304b housed in the distal sealing seat 302b, and, preferably, an anti-extrusion ring 306 housed in the distal seat 302b.

As shown with reference to the entrance sealing group 130, also for the plug sealing group 180 the proximal sealing ring, i.e. the innermost ring in the valve body, in direct contact with the gas in rest conditions, and the distal sealing ring, i.e. the outermost ring in the valve body, are made of different materials in order to obtain an optimal seal in different or only partially overlapping temperature ranges.

Innovatively, the valve according to the present invention allows maintaining a high reliability of the seals while particularly low temperatures are achieved, for example during refueling.

It is clear that a man skilled in the art may make changes to the valve described above in order to meet incidental needs, all falling within the scope of protection defined in the following claims.

The invention claimed is:

1. A methane flow control valve in automotive systems adapted for filling at temperatures of minus 70° C. and below, the valve comprising at least one sealing assembly comprising:
    a tubular valve body having a fluid entrance end configured for receiving fluid flow into the tubular valve body, and an opposite fluid exit end; the tubular valve body defining a radially exterior surface; the tubular valve body defining an obturator chamber within the tubular valve body proximate the fluid exit end housing an obturator, and a fluid entrance aperture proximate the fluid entrance end, the tubular body having a central chamber connecting the obturator chamber and the fluid entrance end and having a smaller diameter than the obturator chamber and the fluid entrance aperture; the tubular valve body being configured to engage a radially inner wall of a fluid duct and to extend into and not beyond the fluid duct;
    an innermost sealing seat formed in the radially exterior surface of the tubular valve body;
    an outermost sealing seat formed in the radially exterior surface of the valve body adjacent to the innermost sealing seat, the innermost sealing seat being axially nearer the fluid exit end than the innermost sealing seat;
    an innermost sealing ring, in direct contact with methane gas in the valve body in rest conditions and housed in the innermost sealing seat;

an outermost sealing ring housed in the outermost sealing seat, the innermost sealing ring being axially nearer the fluid exit end than the outermost sealing ring; and
a threaded portion on the radially exterior surface of the tubular valve body, the threaded portion being alongside the outermost sealing seat and axially further from the fluid exit end than the outermost sealing seat and the outermost sealing ring;
an outer engagement portion having an outer diameter greater than an outer diameter of the threaded portion and axially nearer the fluid entrance end than the threaded portion;
wherein the innermost sealing ring and the outermost sealing ring are made of different materials and the material of the outermost sealing ring at temperatures of minus 70° C. has an elasticity greater than an elasticity of the material of the innermost sealing ring.

2. The valve according to claim 1, wherein the sealing assembly comprises at least one anti-extrusion ring housed in a sealing seat to keep the relative sealing ring in the sealing seat.

3. The valve according to claim 2, wherein the anti-extrusion ring is housed in the outermost sealing seat to keep the relative outermost sealing ring in the outermost sealing seat.

4. The valve according to claim 1, comprising a sealing group.

5. The methane flow control valve according to claim 1, wherein the outermost sealing ring and the innermost sealing ring engage the tubular body and the fluid duct.

6. The valve according to claim 1, wherein the outermost sealing ring is made of an FKM fluorocarbon rubber.

7. The valve according to claim 1, wherein the outermost sealing ring is made of an FMQ or FVMQ fluorosilicone rubber.

8. The valve according to claim 1, wherein an outer diameter of the of the valve body proximate the sealing seats is less than an outer diameter of the threaded portion.

9. The valve according to claim 1, wherein the outer engagement portion is axially aligned with the central chamber.

* * * * *